July 25, 1950          C. D. LOVELACE          2,516,399

FISH LURE

Filed July 25, 1946

C. D. Lovelace
Inventor

By *C. A. Knowles*
Attorneys.

Patented July 25, 1950

2,516,399

UNITED STATES PATENT OFFICE 2,516,399

FISH LURE

Charles D. Lovelace, Bandera, Tex.

Application July 25, 1946, Serial No. 686,215

1 Claim. (Cl. 43—42.29)

This invention relates to fish lures, the primary object of the invention being to provide a fish lure which is so constructed that when it is drawn through the water during fishing, the lure will be caused to rock or oscillate, simulating the movements of live bait.

Another object of the invention is to construct the lure in such a way that colored flags carried thereby may be readily removed and replaced, thereby permitting the alteration of the lure to meet certain fishing conditions.

Still another object of the invention is to provide a fish lure which is weighted to insure the minimum amount of air resistance during casting.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing.

Figure 1:
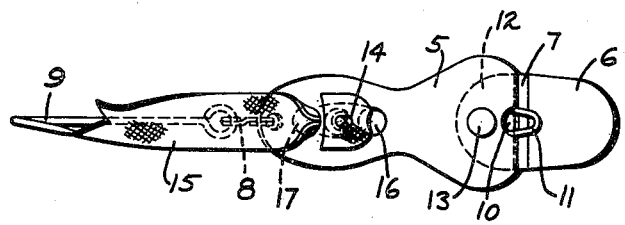
Figure 1 is a plan view of a fish lure constructed in accordance with the invention.

Referring to the drawing in detail, the lure body 5 is formed preferably of sheet metal material capable of being stamped and formed by a single stamping operation of a metal working machine. As shown, the body is formed with a wide forward offset portion 6 providing a shoulder 7, which is disposed at right angles with respect to the body.

From the offset portion of the body, the body slopes downwardly and curves upwardly where it is provided with an opening in which the ring 8 is secured, the ring 8 providing means whereby the hook 9 may be secured to the rear end of the body 5. The body 5 is formed with an opening 10 disposed adjacent to the upper end of the shoulder 7, through which the eye member 11 extends, the eye member 11 being formed of a length of wire formed into a loop, the free ends thereof being extended at right angles, where they are embedded in the weight 12, preferably lead. This weight 12 is secured to the body 5 by means of the rivet 13 which passes through registering openings in the body 5 and weight 12.

Figure 2:
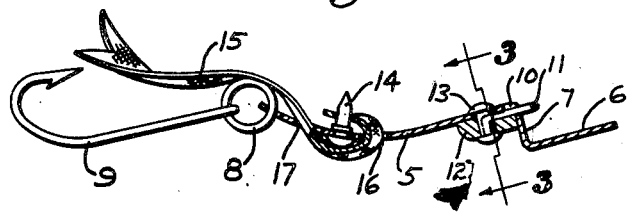
Figure 2 is a longitudinal sectional view through the lure taken to one side of a center line of the body.
Figure 3:
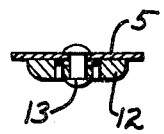
Figure 3 is a sectional view taken on line 3—3 of Figure 2.

Near the rear end of the body, is a pin 14, over which one end of the flag 15 is positioned, the pin 14 piercing the flag as shown by Figure 2 of the drawing. The flag 15 after being secured to the pin 14, is passed through the opening 16 formed in the body 5 on one side of the pin and up through the opening 17 formed on the opposite side of the pin 14, the flag being of a length to extend over the ring 8 and major portion of the hook 9, as shown by Figure 2 of the drawing.

The offset portion 6 being wide, will tend to offer resistance when the lure is pulled through the water during fishing, which, together with the water striking shoulder 7, will cause the lure to rock or oscillate, simulating the movements of a fish or live bait.

It might be further stated that the length of the flag is such that a fish attempting to grab the flag, will be caught by the hook.

It will also be understood that because of the novel manner of securing the flag 15 to the body, these flags, which may be of many colors, may be changed to meet various requirements of use.

Having thus described the invention, what is claimed is:

A fish lure comprising a body constructed of sheet metal material, the rear end of the body being curved upwardly and having spaced openings formed therein, a pin having a piercing upper end, secured to the body between the openings, a hook connected to the body in such a manner as to extend rearwardly therefrom, a length of wide distinctively colored flexible material, said pin extending through the flexible material adjacent to one end of the flexible material, securing the flexible material to the lure, said flexible material extending downwardly through an opening, at one side of the pin and then along the bottom of the lure and upwardly through the opening at the opposite side of the pin securing the flexible material to the body, the length of flexible material covering the major portion of said hook.

CHARLES D. LOVELACE.

REFERENCES CITED

The following references are of record in the file of this patent:

UNITED STATES PATENTS

| Number | Name | Date |
|---|---|---|
| 1,264,627 | Foss | Apr. 30, 1918 |
| 1,418,229 | Buddle | May 30, 1922 |
| 1,638,215 | Rodgers | Aug. 9, 1927 |
| 1,742,786 | Roberts | Jan. 7, 1930 |
| 1,925,197 | Maynard | Sept. 5, 1933 |
| 2,235,905 | Sherwood | Mar. 25, 1941 |
| 2,238,604 | Sabin | Apr. 15, 1941 |
| 2,463,889 | Lundemo | Mar. 8, 1949 |